(12) United States Patent
Marshall et al.

(10) Patent No.: US 7,275,089 B1
(45) Date of Patent: Sep. 25, 2007

(54) SYSTEM AND METHOD FOR STREAMING OF DYNAMIC WEATHER CONTENT TO THE DESKTOP

(75) Inventors: Robert S. Marshall, Ijamsville, MD (US); Christopher D. Sloop, Mt. Airy, MD (US); Chonglin Liu, Rockville, MD (US)

(73) Assignee: AWS Convergence Technologies, Inc., Gaithersburg, MD (US)

( * ) Notice: Subject to any disclaimer, the term of this patent is extended or adjusted under 35 U.S.C. 154(b) by 701 days.

(21) Appl. No.: 09/814,154

(22) Filed: Mar. 21, 2001

Related U.S. Application Data

(60) Provisional application No. 60/276,060, filed on Mar. 15, 2001.

(51) Int. Cl.
*G06F 15/16* (2006.01)
*G01W 1/00* (2006.01)

(52) U.S. Cl. .............................. 709/219; 702/3; 702/2
(58) Field of Classification Search ................ 709/245, 709/219; 342/357.13; 455/404.2; 702/3, 702/2; 345/738
See application file for complete search history.

(56) References Cited

U.S. PATENT DOCUMENTS

| | | | | |
|---|---|---|---|---|
| 5,568,385 | A | | 10/1996 | Shelton ....................... 364/420 |
| 5,848,378 | A | * | 12/1998 | Shelton et al. .................. 702/3 |
| 5,943,630 | A | | 8/1999 | Busby et al. ................... 702/3 |
| 6,018,699 | A | | 1/2000 | Baron, Sr. et al. .............. 702/3 |
| 6,112,074 | A | * | 8/2000 | Pinder ...................... 455/404.2 |
| 6,204,761 | B1 | | 3/2001 | Vanderable ................. 340/539 |
| 6,240,369 | B1 | * | 5/2001 | Foust ............................ 702/3 |
| 6,339,747 | B1 | | 1/2002 | Daly et al. ...................... 702/3 |
| 6,343,255 | B1 | * | 1/2002 | Peek et al. ..................... 702/3 |
| 6,498,987 | B1 | | 12/2002 | Kelly et al. ..................... 702/3 |
| 6,590,529 | B2 | * | 7/2003 | Schwoegler ........... 342/357.13 |
| 6,591,305 | B2 | * | 7/2003 | Densmore ................... 709/245 |
| 6,823,263 | B1 | * | 11/2004 | Kelly et al. ..................... 702/3 |
| 6,980,908 | B2 | * | 12/2005 | McKewon et al. ............ 702/3 |

(Continued)

*Primary Examiner*—Jungwon Chang
(74) *Attorney, Agent, or Firm*—Oblon, Spivak, McClelland, Maier & Neustadt, P.C.

(57) ABSTRACT

A method, system and program product for streaming of dynamic information content over an interactive media such as the Internet. The dynamic content, such as dynamic weather data, is collected from a plurality of collection sources such as geographically distributed local weather reporting stations. The data information can be relatively static or dynamic, constantly changing data. The dynamic content is stored in databases maintained on a direct access storage device at the dynamic content server. The selection of dynamic content to be transmitted to the end user client is based on a demographic profile that is completed at the time of end user client registration and which precedes delivery of any selected content in response to end user client requests. An application resident on the dynamic content server streams selected content simultaneously to a plurality of end user client devices for each end user client request. An application resident on each end user client device generates a plurality of processing threads for a series of independent commands, each of which is transmitted to the dynamic content server at specified preset intervals and generates a server-selected response. In a weather content collection and delivery embodiment, local, real-time weather data can be received continuously from thousands of weather reporting stations, and transmitted simultaneously by the weather content server to millions of end user desktop clients, with each user receiving current weather data that is generated from a nearby weather collection station.

28 Claims, 15 Drawing Sheets

U.S. PATENT DOCUMENTS

2002/0090932 A1* 7/2002 Bhatia et al. ............... 455/412
2002/0130899 A1* 9/2002 Ryan et al. ................. 345/738
2004/0010372 A1* 1/2004 Schwoegler .................. 702/3

* cited by examiner

SYSTEM AND METHOD FOR STREAMING OF DYNAMIC WEATHER CONTENT TO THE DESKTOP

CROSS-REFERENCE TO RELATED APPLICATION

This patent application is related to, and contains common disclosure with, co-pending and commonly assigned patent application "Method for Enhancing the Effectiveness of Advertising Delivery Over Interactive Media", Ser. No. 09/813,751. The co-pending patent application is hereby incorporated by reference into this description as fully as if here represented in full.

BACKGROUND OF THE INVENTION

The present invention relates generally to information delivery over a wide area network, and more particularly, to a method, system and program to efficiently deliver real-time, local, and personally relevant weather content directly to an end user client device.

Since the advent of the Internet it has been widely believed that the Internet would be the medium of choice for the delivery of personalized content, be it news, weather, sports, entertainment or otherwise. While progress has been made in many areas, many shortcomings remain in this medium, particularly in the area of the delivery of weather information.

Of all content areas, weather is extremely unique for a number of reasons. Unlike other content areas, the current weather experienced by almost every individual is different. At a minimum, very small changes in geographic location can result in experiencing significant changes in weather conditions. Furthermore, weather is dynamic and changes in real-time. Conditions experienced now are almost certain to change in a very short period of time.

Current delivery of weather content on the Internet falls short in a number of areas. First, users are required to direct their web browser to a specific Uniform Resource Location (URL), requiring several key strokes. Once at a particular web page with weather content, in most circumstances, the user must navigate to his local information through a series of clicks on geographic maps or via entry of his zip code. Once a user arrives at a web page with local information it is typically neither local (by weather standards), or current (real-time by weather standards). For example, the reporting location for most web sites is a local airport with data delivered by the National Weather Service (NWS). Since most people do not live near the airport, conditions often vary from their own location. Further, airport observations from the NWS are typically 30–90 minutes old by the time they are delivered to an end user on the web.

SUMMARY OF THE INVENTION

The present invention overcomes existing deficiencies in the delivery of real-time, local, personally relevant weather information. It uses a proprietary network of nearly 5,000 weather reporting stations (weather stations). One click access is provided to the end user client to access real-time, local weather conditions without end user entry of URLs to gain access to this weather information. One click access provides fully customized, real-time, localized updates. The present invention, in many ways, serves as a giant "switching" system, seamlessly connecting thousands of real-time weather stations ($S_n$) to millions of users ($U_n$). Each individual user is provided a customized desktop weather portal with the most local, real-time weather information available.

In a desktop embodiment of the present invention for weather recording and reporting, the Internet is used to connect a weather content server directly to nearly 5,000 automated weather reporting stations that make up the weather network. The desktop weather application is client software downloaded and installed on hundreds of thousands of computer "desktops" all over the United States, with virtually unlimited expansion capability. Stations are preferably connected to a direct Internet connection so that the data is always reported in real-time. Alternatively, stations can be polled periodically by the weather content server through a standard phone line/modem setup. The weather content server repackages the weather data and sends it out live over the Internet to the desktops (client devices) of connected subscribers. Millions of desktop or laptop computers can be simultaneously connected to the information collection server(s) and receive live weather data that has been reported from a nearby weather station.

When a subscriber runs the live weather program (identified by the name "WeatherBug") on a computer with an active Internet connection (either direct or dial-up), the subscriber is connected to the server site which provides weather data from a station that is closest to a zip code specified when he registers as a subscriber. When the program is running, the current temperature is displayed as an icon in the lower right corner of the desktop screen in a Windows tray. As long as the subscriber remains connected to the Internet, the weather application program temperature icon updates itself at regular intervals. Clicking on the weather application temperature icon spawns a full screen display that provides access to complete weather conditions, forecasts, instant camera images, radar and storm alerts. A setup button on this display enables the subscriber to enter a different zip code and select a different weather reporting site.

When the National Weather Service issues a storm watch or warning for a particular location, based on the applicable zip codes for the alert, the weather application temperature icon will flash and provide an audio alert (such as "cricket" sound) to affected subscribers that are connected to the Internet until the subscriber clicks on the icon to view the alert.

DESCRIPTION OF DRAWINGS

The invention is better understood by reading the following detailed description of an exemplary embodiment in conjunction with the accompanying drawings, wherein.

DETAILED DESCRIPTION OF INVENTION

The following detailed description of the present invention is provided as a detailed, enabling teaching of the present invention in its best currently known embodiment. Those skilled in relevant arts will recognize that many changes can be made to the embodiment described while still obtaining the beneficial results of the present invention. It will also be apparent that some of the desired benefits of the present invention can be obtained by selecting some of the features of the present invention without using other features. Accordingly, those who work in the art will realize that many modification and adaptations to the present invention are possible and may even be desirable in certain circumstances and are a part of the present invention. Thus, the following description is provided as illustrative of the principles of the present invention and not in limitation thereof, since the scope of the present invention is defined solely by the claims.

Figure 1:
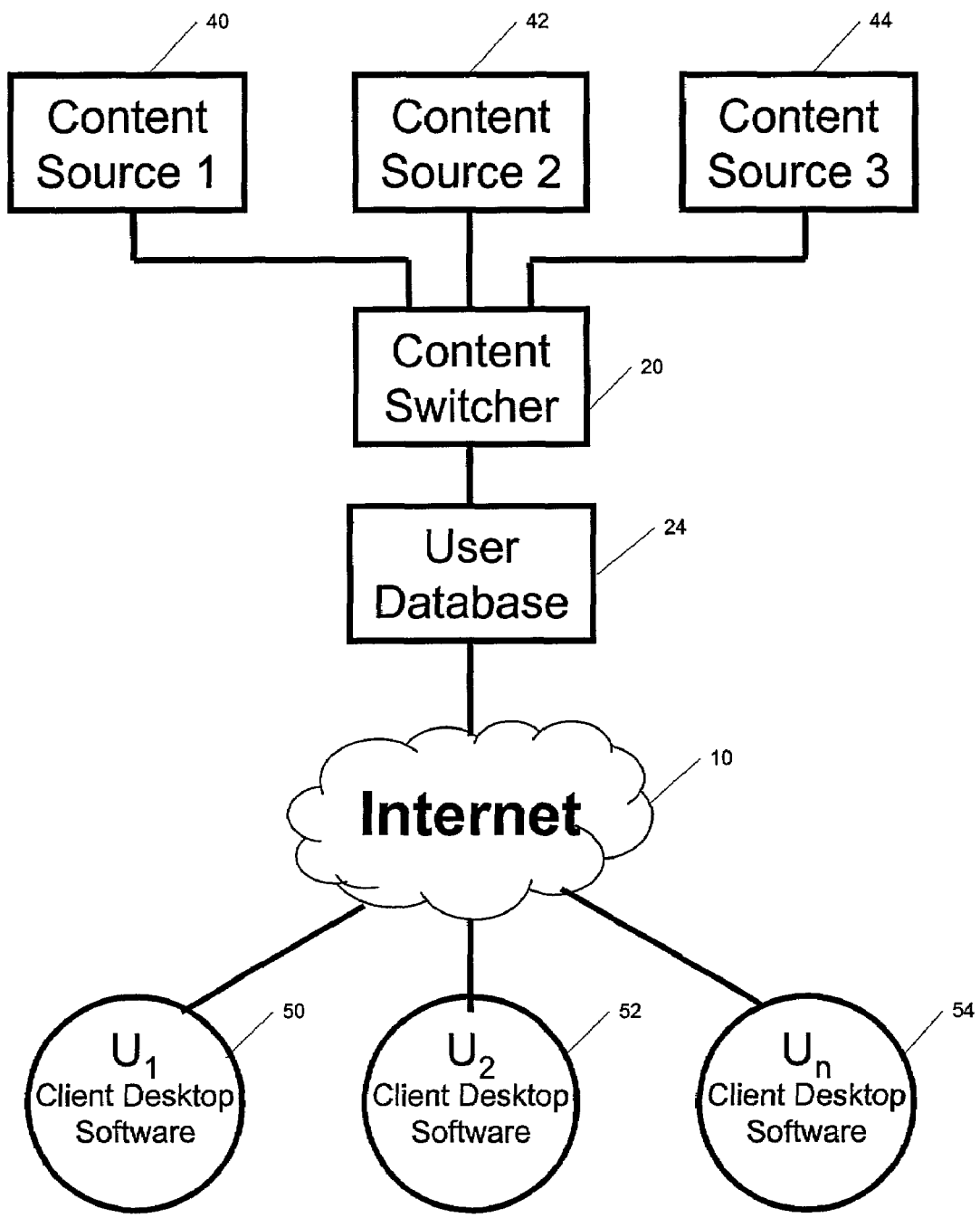
FIG. 1 illustrates a wide area network environment for collecting and delivering dynamic content to a desktop or other client device in accordance with an exemplary embodiment of the present invention.

The present invention can operate in the context of a wide area network, such as is depicted in FIG. 1. The environment includes a wide area network 10 that can be Internet. Information content is collected from a variety of sources such as information source and reporting stations (content sources) 40, 42, 44. Content sources 40, 42, 44 can feed data into the system via the Internet, satellite or other types of communications. In the context of the weather information collection and delivery system embodiment, thousand of weather reporting stations throughout the country deliver live local weather data to a real-time weather switch. The information content is transmitted to the information content server (content switcher) 20 via wide area network 10. The information content is stored in a plurality of data files in an information content database (not shown). The information content server 20 selects and delivers the information content based on end user information stored in user database 24 via the wide area network 10 to end user clients 50, 52, 54. End user client devices include laptops, workstations, wireless handheld devices, and desktop computers. These end user client devices transmit information request to the information content (content switcher) server via message transmitted over the wide area network 10.

Figure 2:
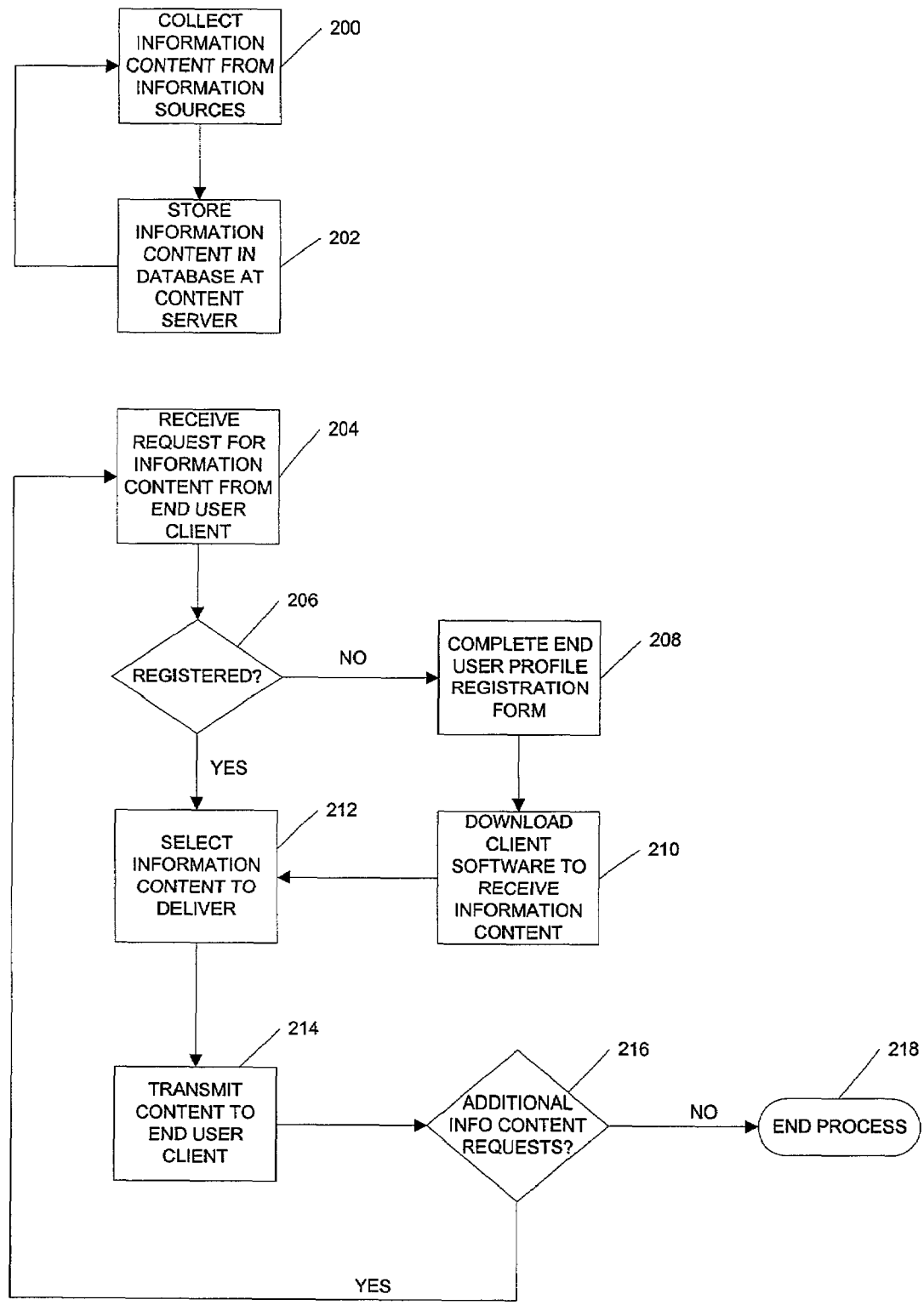
FIG. 2 illustrates the processing logic for collecting and delivering dynamic information content in accordance with an exemplary embodiment of the present invention.

FIG. 2 illustrates the general processing logic for collecting, integrating and delivering dynamic information content, such as real-time weather, in accordance with the present invention. The figure is divided into an information content processing section and an information content delivery section. The information content processing commences in logic block 200 with the collection of dynamic information content from one or more information sources. Dynamic in the present context refers to any type of content that is generated in real-time or near real-time. The dynamic information content is stored in an appropriate file in the information content database at the information content server, as indicated in logic block 202. From logic block 202, processing loops back to logic block 200 for the collection of additional information content from the one or more information sources. This also indicates that the information content is being updated continuously over time.

The actual processing of a request for information content starts in logic block 204 with the receipt of the request for dynamic information content from an end user client. The information content server determines if the end user client is a registered user, as indicated in decision block 206. If the end user client is not a registered user, a registration form, including a user profile, must be completed before further processing of the request for dynamic information content delivery, as indicated in logic block 208. Upon submission of the user profile registration form, the end user can download software to the client device to receive the information content, as indicated in logic block 210. If the end user client is determined to be a registered user in decision block 206, or if the end user client has completed the user profile registration form and downloaded the client software to receive dynamic information content, as indicated in logic blocks 208 and 210, processing continues in logic block 212 with selection of information content to be delivered to the end user, as indicated in logic block 212. The selected information content and is then transmitted to the end user client, as indicated in logic block 214. Next, in decision block 216, a test is made to determine if there are additional dynamic information content requests pending. If there are, then processing returns to logic block 204 for receipt of the next request for dynamic information content. Otherwise, processing ends, as indicated in termination block 220. As long as the end user client is connected to the information content server, the end user client application continues to issue additional requests for dynamic content at predetermined time intervals that are specified in the dynamic content response message.

Figure 3:
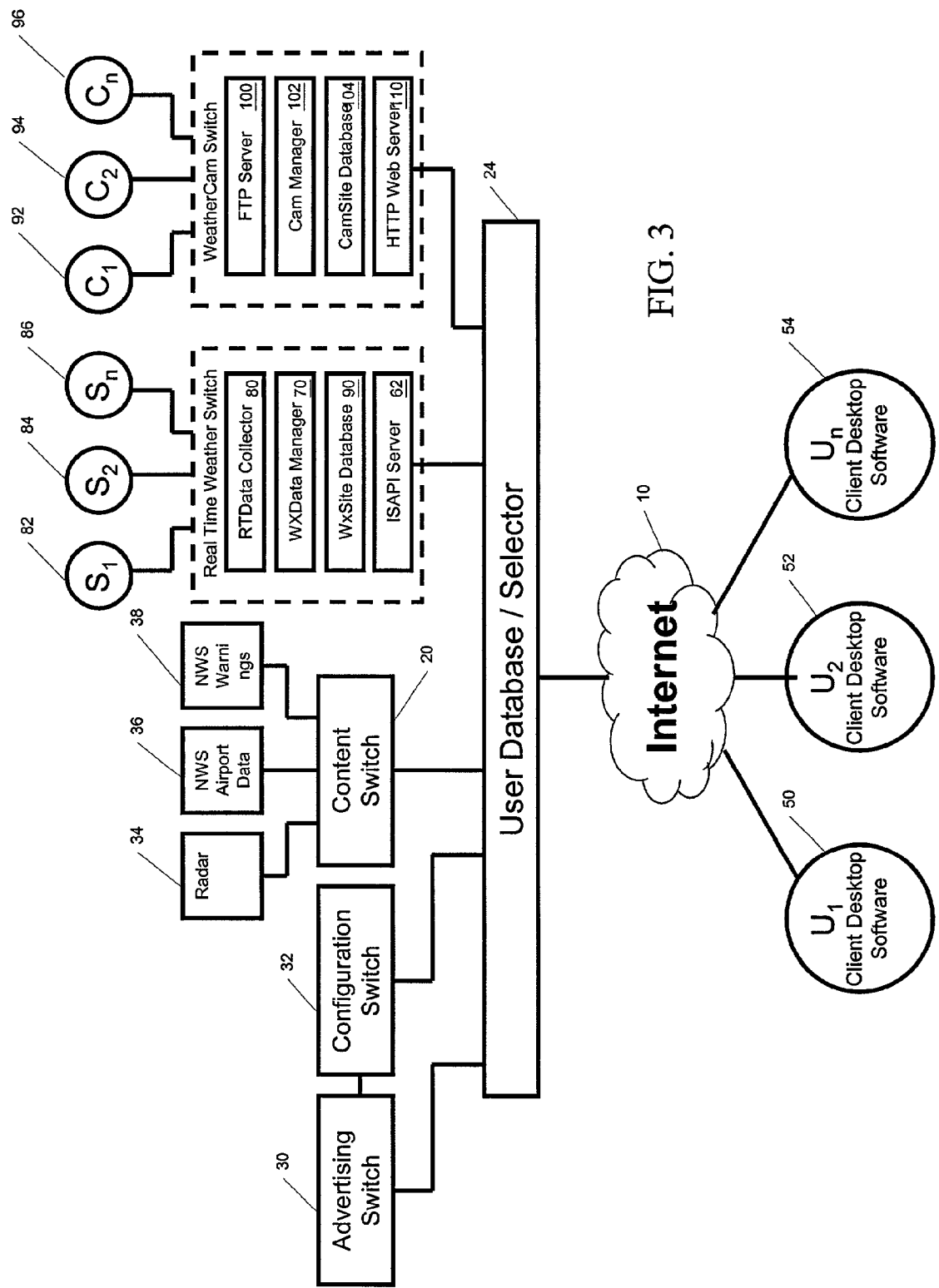
FIG. 3 illustrates an overall system architecture for collecting weather content from a plurality of sources and delivering the weather content to a plurality of end user client desktops in accordance with an exemplary embodiment of the present invention.

To illustrate the concepts of the invention in the exemplary context of real-time weather content delivery to a desktop that is online, refer to the system diagram of FIG. 3. First, it should be noted that weather web sites are among the "stickiest" web sites on the Internet, and the web site of the assignee of the present invention ranks among the top ten stickiest web sites. Sticky web sites retain the user's attention for greater periods of time and consistently bring back the visitors to the web site. The average home visitor to the assignee's web site stays for close to 3 hours as compared to the America Online sites that average around 30 minutes per visitor.

FIG. 3 illustrates the overall system architecture for collecting weather content from a plurality of sources and delivering the weather content to a plurality of end user client desktops. Weather stations $S_n$ 82, 84, 86 deliver real-time weather to the real-time weather switch. The real-time weather switch includes an RTData Collector 80, a WXData Manager 70, a WXSite database 90 and ISAPI server 62. The components of the real-time weather switch are described more fully below in the context of the description of FIG. 6. Outdoor weather conditions are photographed by digital cameras $C_n$ 92, 94, 96 and transmitted to a WeatherCam switch that includes an FTP server 100, a Cam Manager 102, CamSite database 104, and an HTTP web server 110. Also other sources of data in FIG. 3 include a plurality of geographically distributed radar systems 34, National Weather Service (NWS) airport data 36 and NWS warnings 38. These other sources of data are fed to a content switch 20 and transmitted via user database/selector 24 to end user clients. Advertising switch 30 (selects advertising to deliver with the real-time weather data) and configuration switch 32 are logically connected to user database/selector 24. Configuration switch 32 is a server-side application that controls the desktop configuration that is sent to a specific end user for the display of weather content. The ISAPI server 62 and the HTTP web server 110 are also logically connected to user database/selector 24. The user database/selector stores end user profile information gathered from a user registration process and selects the weather content to deliver to a specific end user. Selected weather content from the various sources is delivered with or without an advertising component over the Internet 10 to client desktop devices $U_n$ 50, 52, 54.

Figure 4:
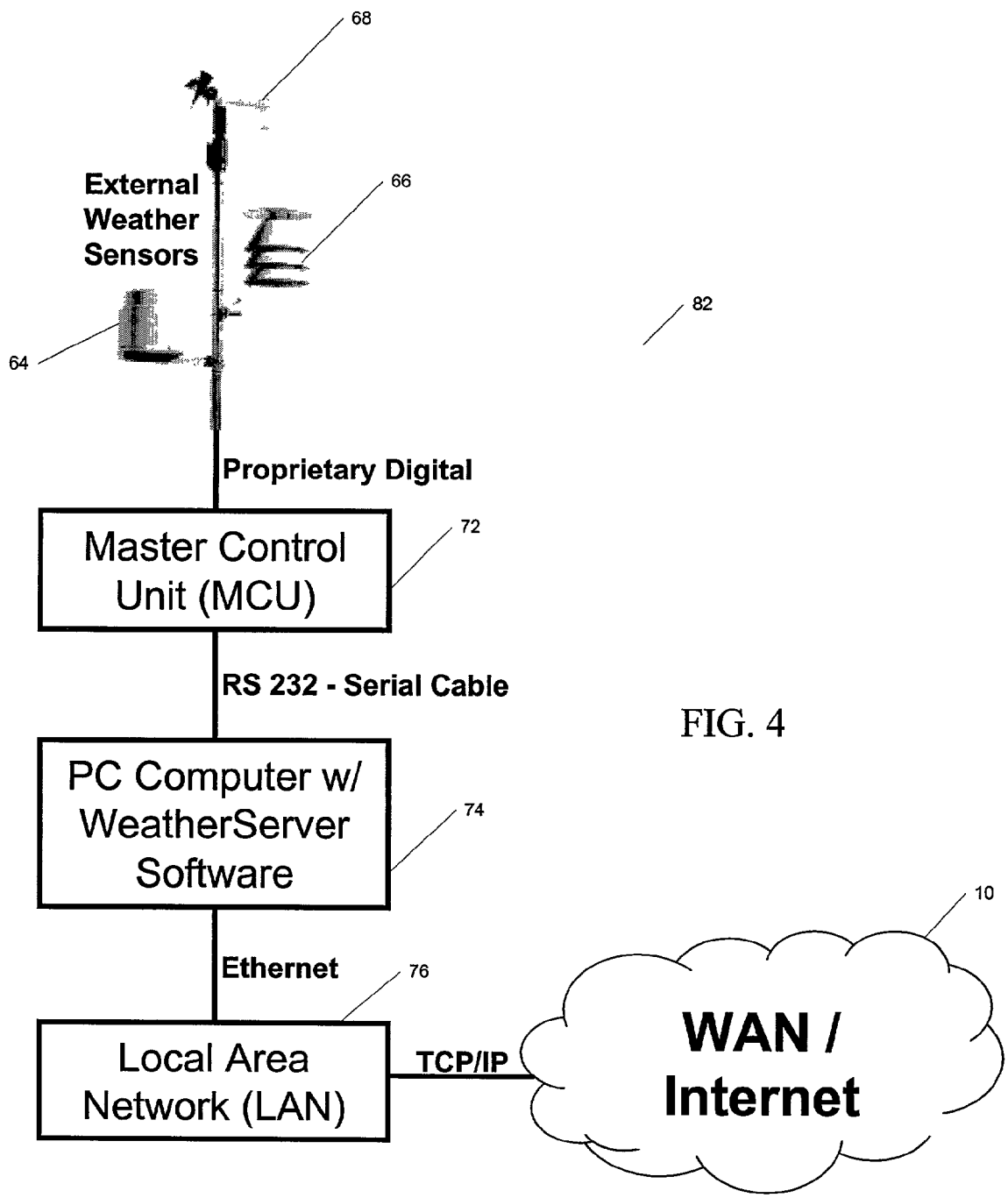
FIG. 4 illustrates a typical weather station configuration in accordance with an exemplary embodiment of the present invention.

FIG. 4 illustrates a typical weather station $S_n$ configuration. It includes external weather sensors 64, 66, 68 which are connected via a proprietary digital connection to a master control unit (MCU) 72. The master control unit 72 is connected via an RS232 serial cable to a PC computer 74 on which weather server software has been loaded. The PC computer 74 is connected to a local area network (LAN) 76 via an Ethernet or Token Ring connection. The local area network 76 in turn is shown connected via a TCP/IP connection over a wide area network such as the Internet 10 to the real-time weather switch. Alternately, the PC computer 74 can connect with the real-time weather switch over the Internet using a modem.

Figure 5:
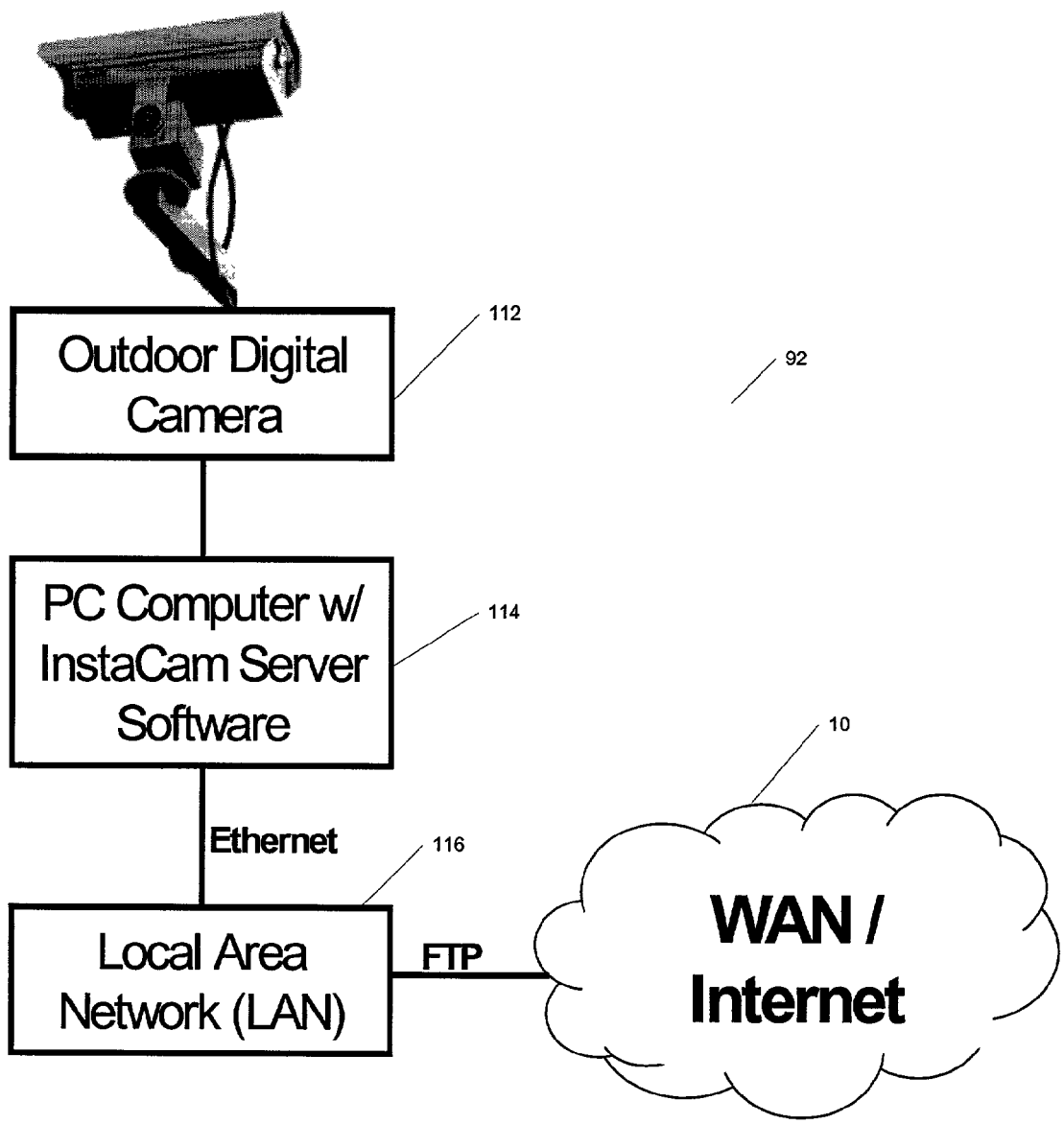
FIG. 5 illustrates a typical digital weather camera configuration in accordance with an exemplary embodiment of the present invention.

FIG. 5 illustrates a typical WeatherCam $C_n$ configuration. The installation includes an outdoor digital camera 112, which is connected to a PC computer 114 having InstaCam server software installed. PC computer 114 is connected to local area network (LAN) 116 via an Ethernet or Token Ring connection. The WeatherCam data is transmitted via a File Transfer Protocol (FTP) connection to the WeatherCam switch over the wide area network 10. Alternately, the PC computer 114 can connect with the WeatherCam switch over the Internet using a modem.

Figure 6:
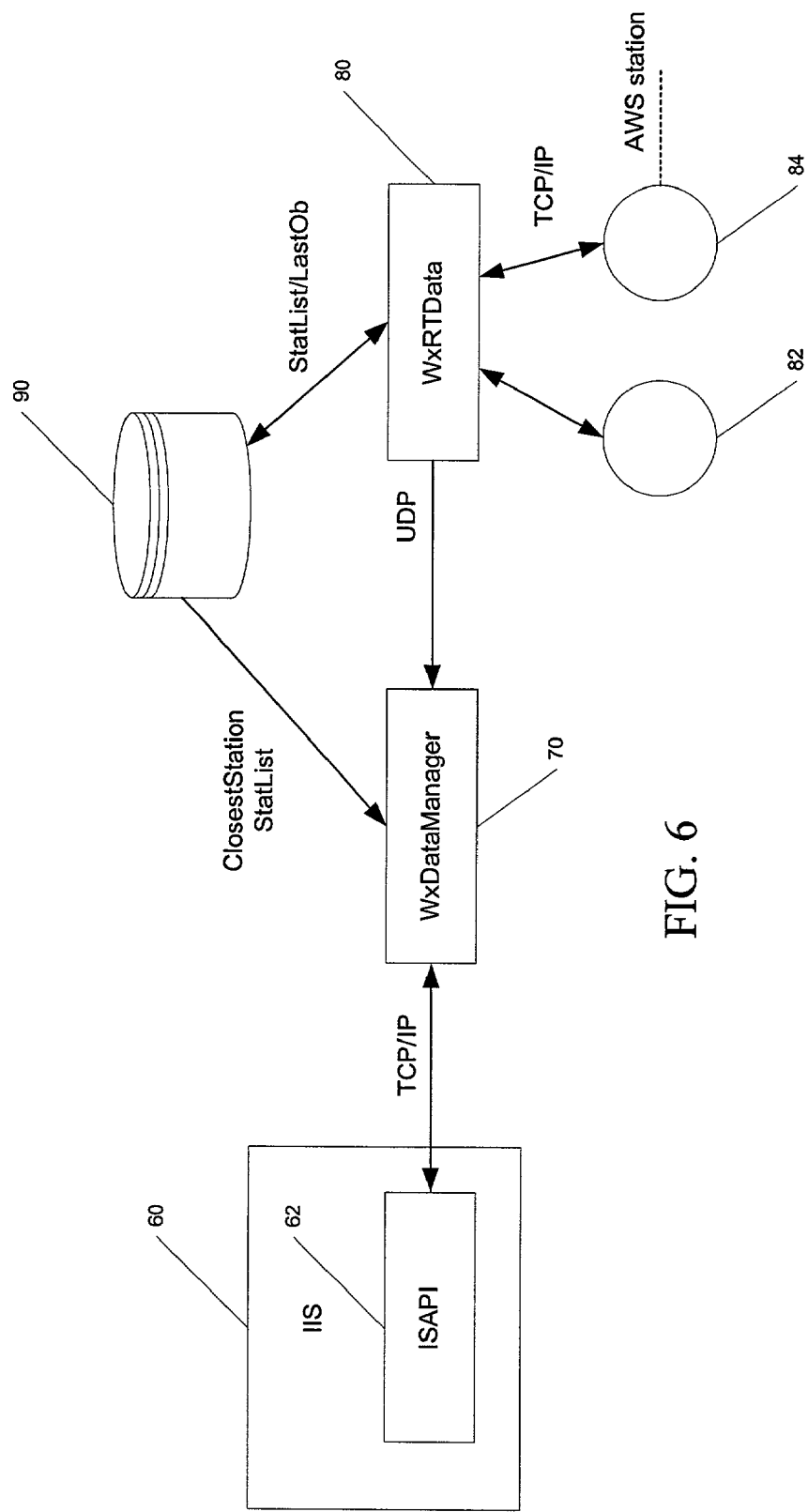
FIG. 6 illustrates the architecture of a real-time weather switch in accordance with an exemplary embodiment of the present invention.

As illustrated in FIG. 6, there are two server programs that serve as the gateway for obtaining real-time weather data from all real-time weather stations. The two server programs are WxRTData 80 and WxDataManager 70. They are referred to collectively herein as weather content server and are represented generally as content switcher (information content server) 20 in FIG. 1. The WXDataManager 70 serves as a gateway for all of the client programs, including the desktop weather application and web browsers to collect real-time weather data. WXDataManager 10 maintains a memory cache for the latest weather data for all the stations. It listens and responds to the User Datagram Protocol (UDP) data from WxRTData 80 and the Transmission Control Protocol/Internet Protocol (TCP/IP) requests from the Internet Server Application Programming Interface (ISAPI) 62 of Internet Information Server 60, or other server programs. In this exemplary embodiment, Internet Information Server (IIS) 60 is a web server available for download from Microsoft Corporation. IIS 60 includes the open Internet Server API (ISAPI) 62 that provides server extensions. IIS enables the management of multiple servers with a specific function, or management of servers with multiple functions. IIS also provides a File Transfer Protocol (FTP) service to transfer files in either direction between a client and a server. IIS further includes a built-in tracking function that enables it to monitor which users have accessed which service, and how frequently.

ISAPI contains programming tools to customize IIS and an underlying Windows NT server operating system. ISAPI was developed to overcome the performance problems associated with the Common Gateway Interface (CGI) scripting standard in a large production web environment. ISAPI uses Dynamic Linked Libraries (DLLs) that are loaded into server memory and kept in a cache in memory instead of reloading for every process that requests it. ISAPI DLLs are called by a client in the same way it might have called a CGI script, i.e., by using a get or post request. ISAPI uses a request mapping system by which each request has a parse map, that has a table in memory that directs data accompanying a web request to an appropriate data structure.

Active Server Pages (ASP) is a tool from Microsoft Corporation that is used for the dynamic creation of web pages. ASP is a server-side scripting environment that comes with IIS. ASP allows the embedding of scripting commands inside an Hypertext Markup Language (HTML) document. The scripting commands are interpreted by the server, translated into the corresponding HTML and sent back to the server. This enables the web developer to create dynamic web content. Since the server only returns HTML code, it does not matter which web browser is used by the web site visitor. ASP pages have an .asp extension instead of an .html extension. This informs the web server to process the scripting in the web page. When a browser requests an ASP file from the server, it is passed on to the ASP-processing DLL for execution. After processing, the resulting file is sent to the requesting browser. Any scripting commands embedded from the original HTML file are executed and then removed from the results.

For database 90 access, an array is created to record the weather data. The item number for a station is determined by reading the content from STATIONID.INI. Querying a ZIP-STATIONS table creates a list, which records all the closest stations for a given zip code. The WxRTData program 80 listens on port #96 for UDP data. It then updates the data array based on the station ID.

When a TCP/IP request is received from an ISAPI server program 62, the data from the data array is gathered and sent to the client. If the weather data for a station is marked as being "down", the data in the next "up" station in a zip code is reported.

WxRTData 80 keeps persistent connections to all the real-time weather stations 82, 84 and pulls the latest weather data for a given time interval. It then sends the weather data to WxDataManager 70 in an UDP datagram. For setting up this server program, certain parameters are needed. The parameters include destination IP addresses, query intervals, thread numbers, and station list. WxRTData program 80 keeps a persistent connection to each station in the list. Each connection is established in a separate thread. When a data package is received, it is sent to the destination IP addresses through UDP data. The latest data is also recorded in the database 90.

When an end user registers as a subscriber, he is asked to provide information such as name, email address, and information about his preferences, in order to personalize the information delivered to him as a subscriber. The information that is collected online is generally referred to as personally identifiable information. The weather content (i.e., information content) server 20 assigns a random registration number to each new registered subscriber. This random registration number is placed in a small text file called a cookie that is stored by the weather content server 20 on the subscriber's computer (i.e., client device). The unique identification number automatically identifies the subscriber's browser to the weather content server 20 whenever the subscriber interacts with the server 20. Every web page that is accessed by the subscriber 50, 52, 54, 56 that includes advertising or content served will have the contents of the subscriber cookie reported in the weather content server logs.

Figure 7:
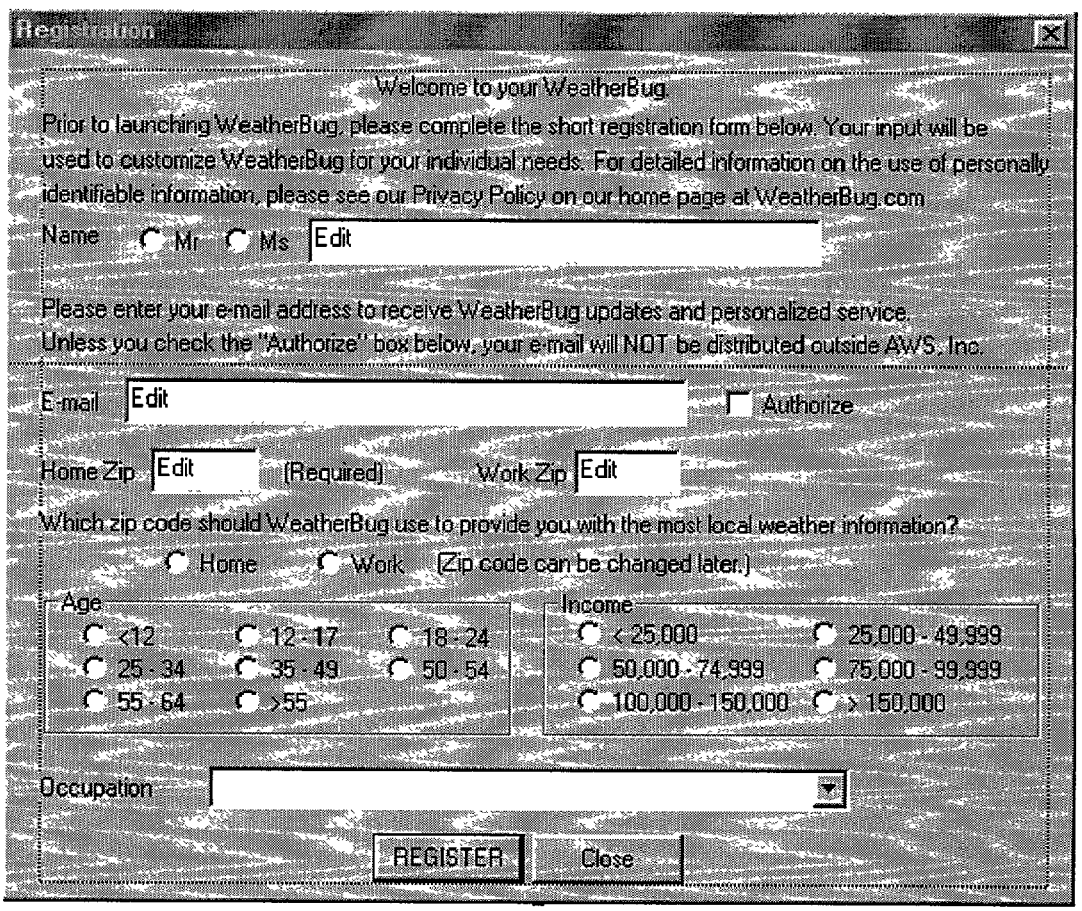
FIG. 7 illustrates a subscriber registration display associated with a desktop weather information application in accordance with an exemplary embodiment of the present invention.

In an exemplary desktop weather application, when the weather application is first installed, the dialog registration is popped-up and the user is asked to input requested information. An exemplary registration dialog window is illustrated in FIG. 7.

Based on the information the end user provides, the following information is returned to him as a new subscriber: (a) registration number, which is displayed in the About box, and (b) all the information from the setup function. If the registration is successful, the weather application runs immediately on the client device and no further setup is needed. The weather reporting station is the first one in the list for the subscriber's zip code area. If the registration attempt is not successful, the weather application is not able to run, and the registration dialog is popped up again whenever the program is restarted.

Figure 8:
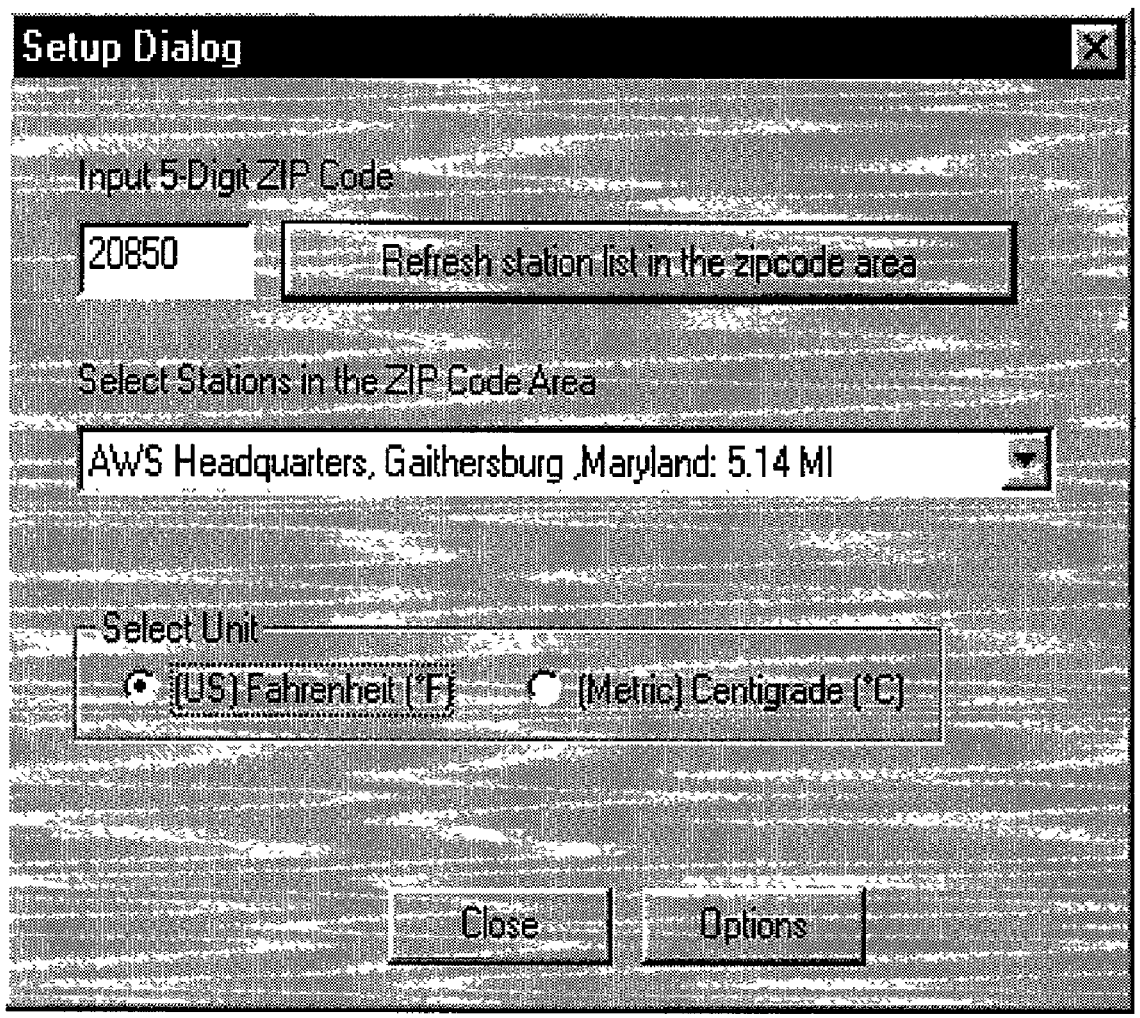
FIG. 8 illustrates a setup dialog display for the desktop weather application in accordance with an exemplary embodiment of the present invention.

If the user wants to change the weather application client settings after registration, he can use the setup function to do so. Two separate dialogs are used in the setup function. An exemplary setup dialog window is illustrated in FIG. 8.

The station selected from the setup dialog is the primary station for the weather application. The user may want to look at other stations in the weather content server's weather net periodically, a secondary station can be selected on the web page, which can be launched by clicking some specific buttons such as national or branding buttons. When a secondary station is chosen all the tabs and buttons correspond to the new station. There is a specific title bar indicating the secondary station such as "Hurricane Station XXX, click here to return home". There are three ways for returning to the primary station: (a) clicking on the window title bar; (b) minimizing/closing the desktop weather application; and (c) clicking the setup button.

The link Uniform Resource Locator (URL) format for selection of the secondary station is as follows:

GetDesignURL?ID=AWSHQ&ZIP=20866&Title= "Hurricane station, Click here to return"

In the link URL the target tag is:

Target="_SECOND_STATION".

The GetDesign URL can be the same as the one used for primary stations or a special URL. The input/output for GetDesign URL is the same as described above.

The desktop weather application then calls GetDesign URL to load the design information as described further below. No information for the new station is saved to the registry, i.e., if the user terminates and restarts the weather application, it behaves as though nothing has happened.

Figure 9:
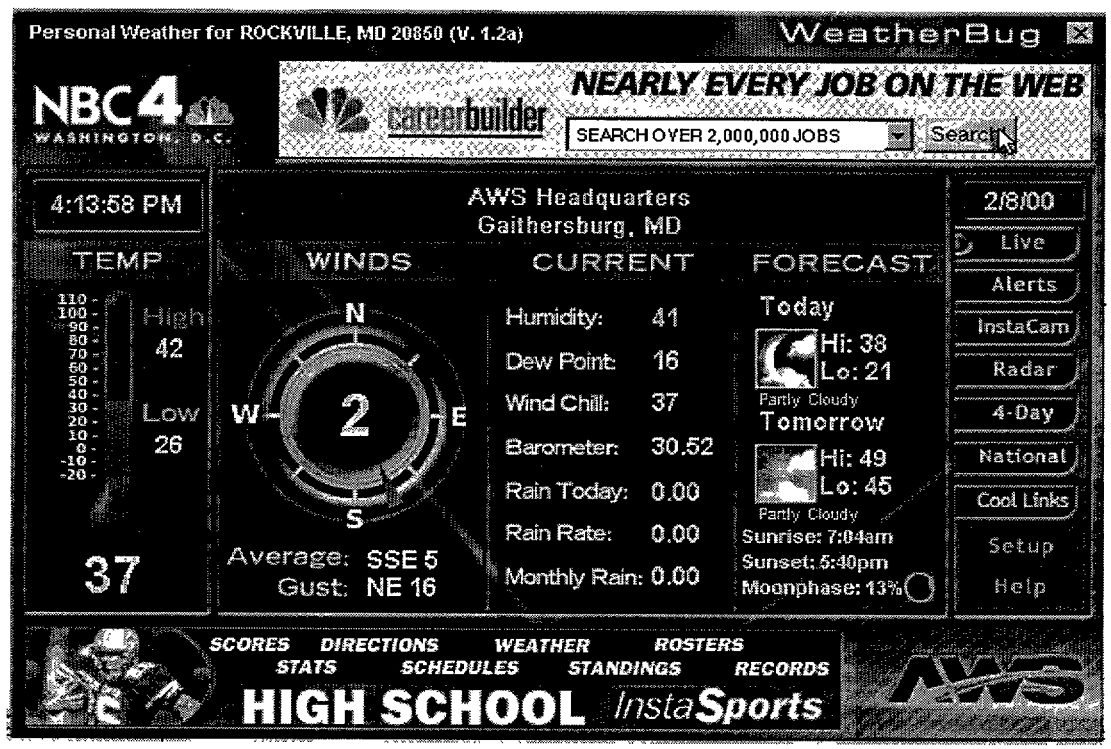
FIG. 9 illustrates a weather information content display delivered to the desktop in accordance with an exemplary embodiment of the present invention.
Figure 10A:
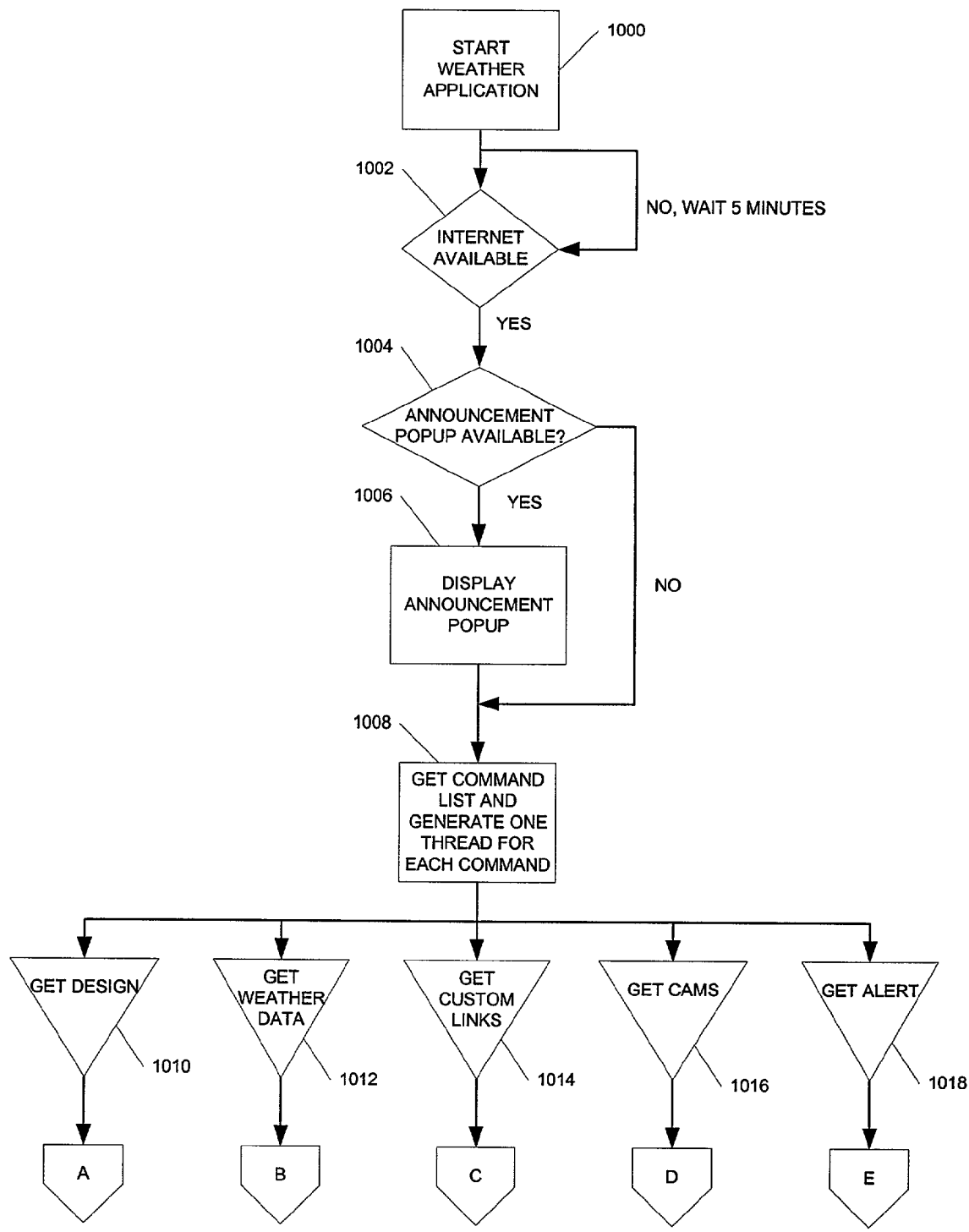
FIGS. 10A–10F illustrate the processing logic for streaming dynamic content to the desktop weather application in accordance with an exemplary embodiment of the present invention.
Figure 10B:
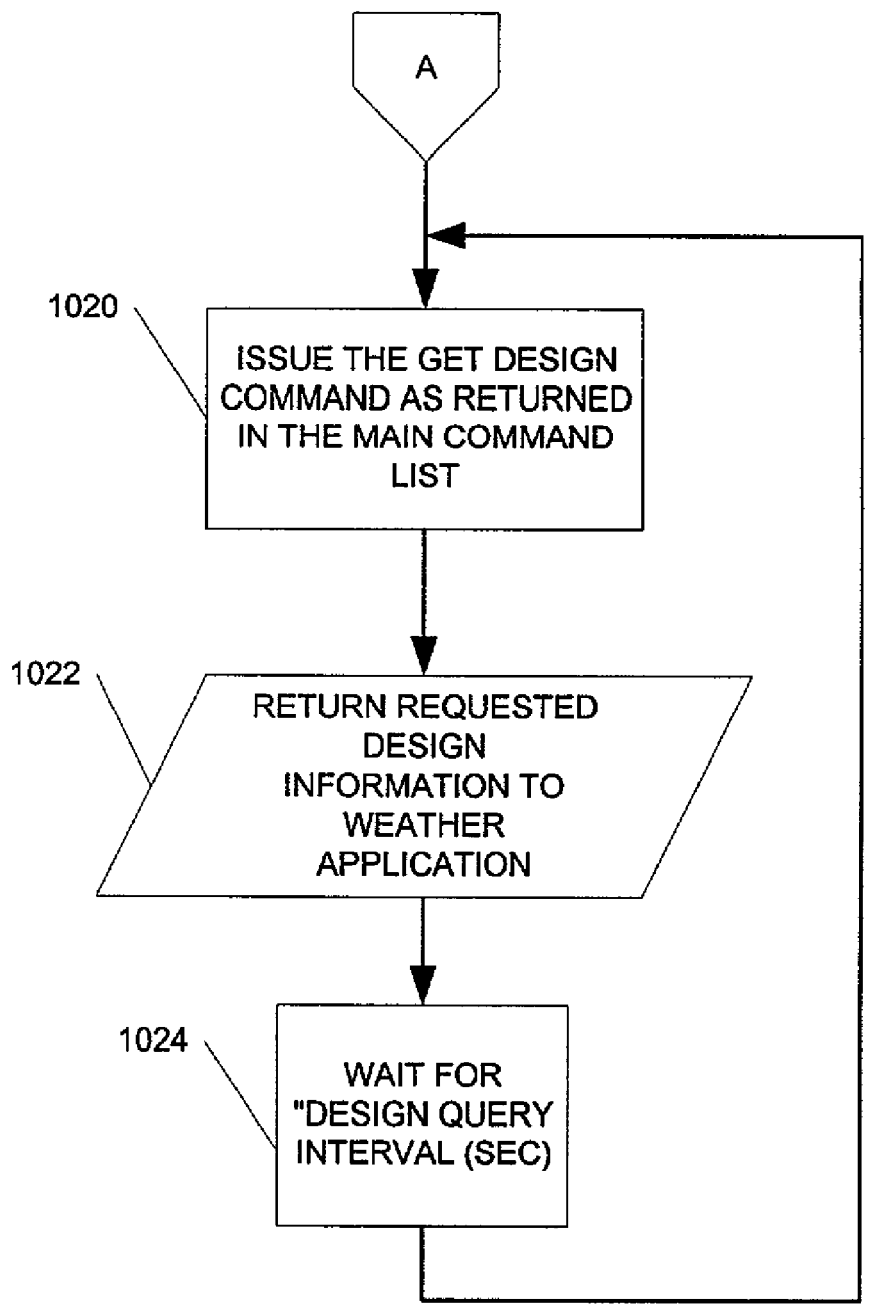
Figure 10C:
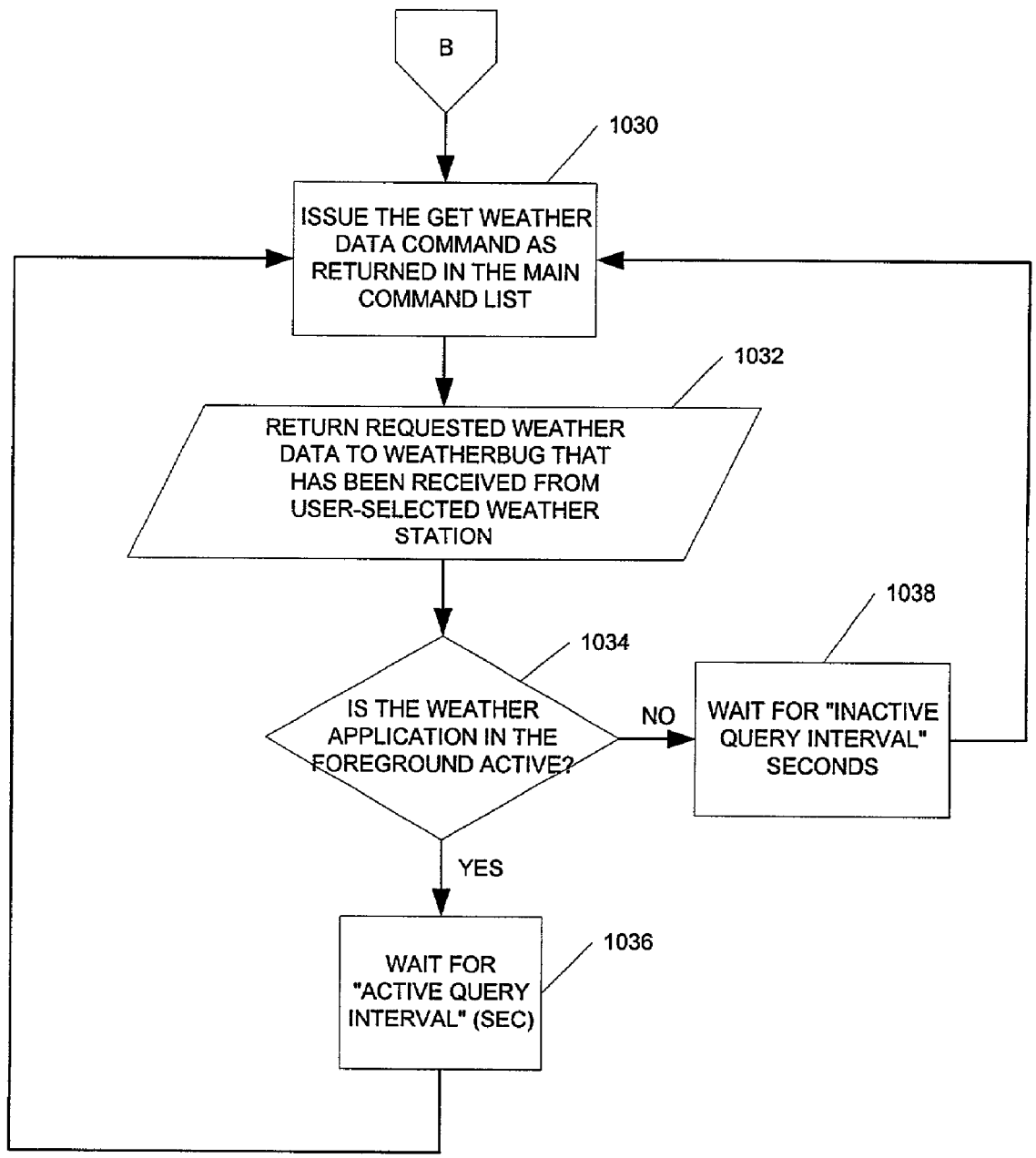
Figure 10D:
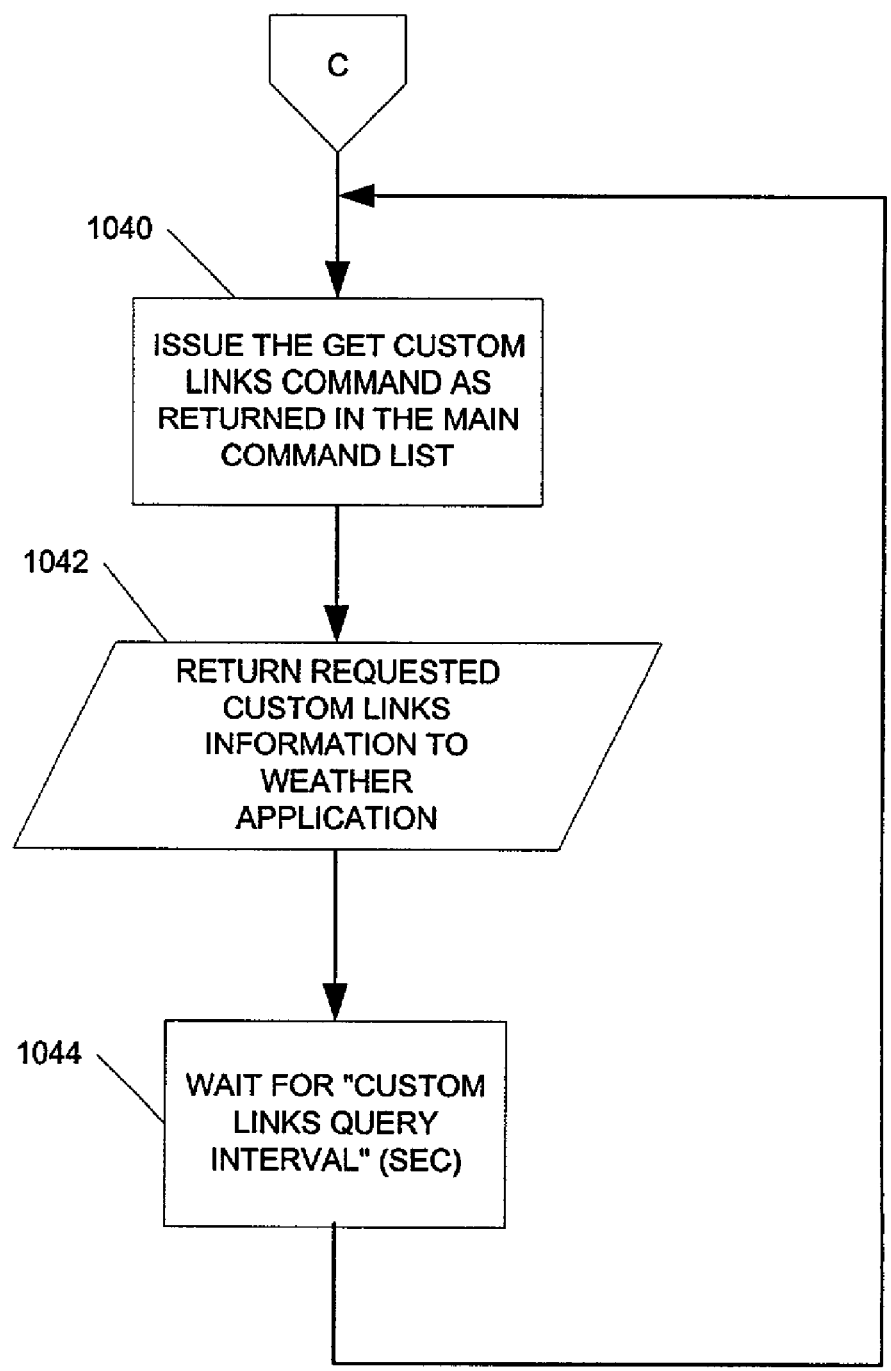
Figure 10E:
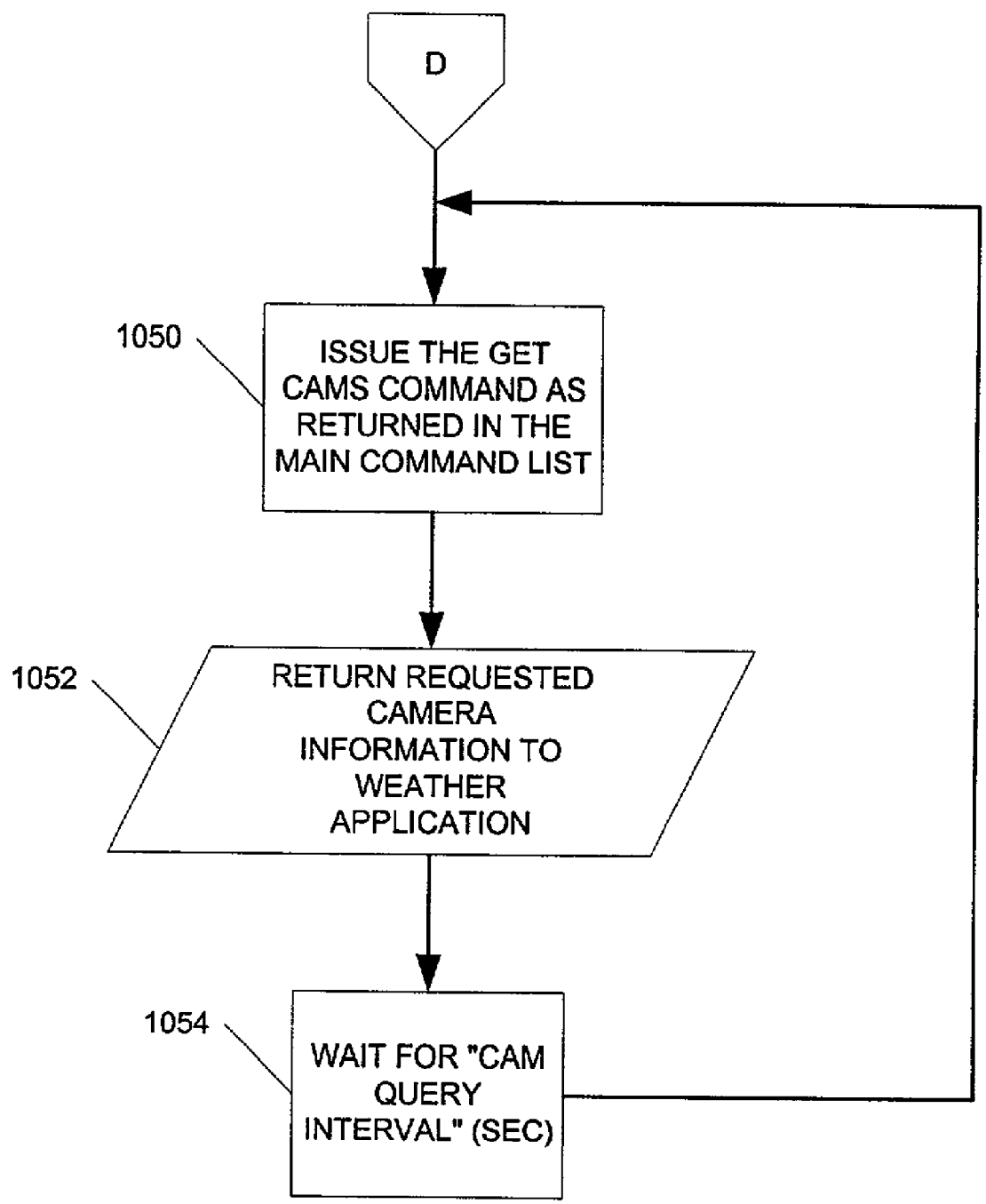
Figure 10F:
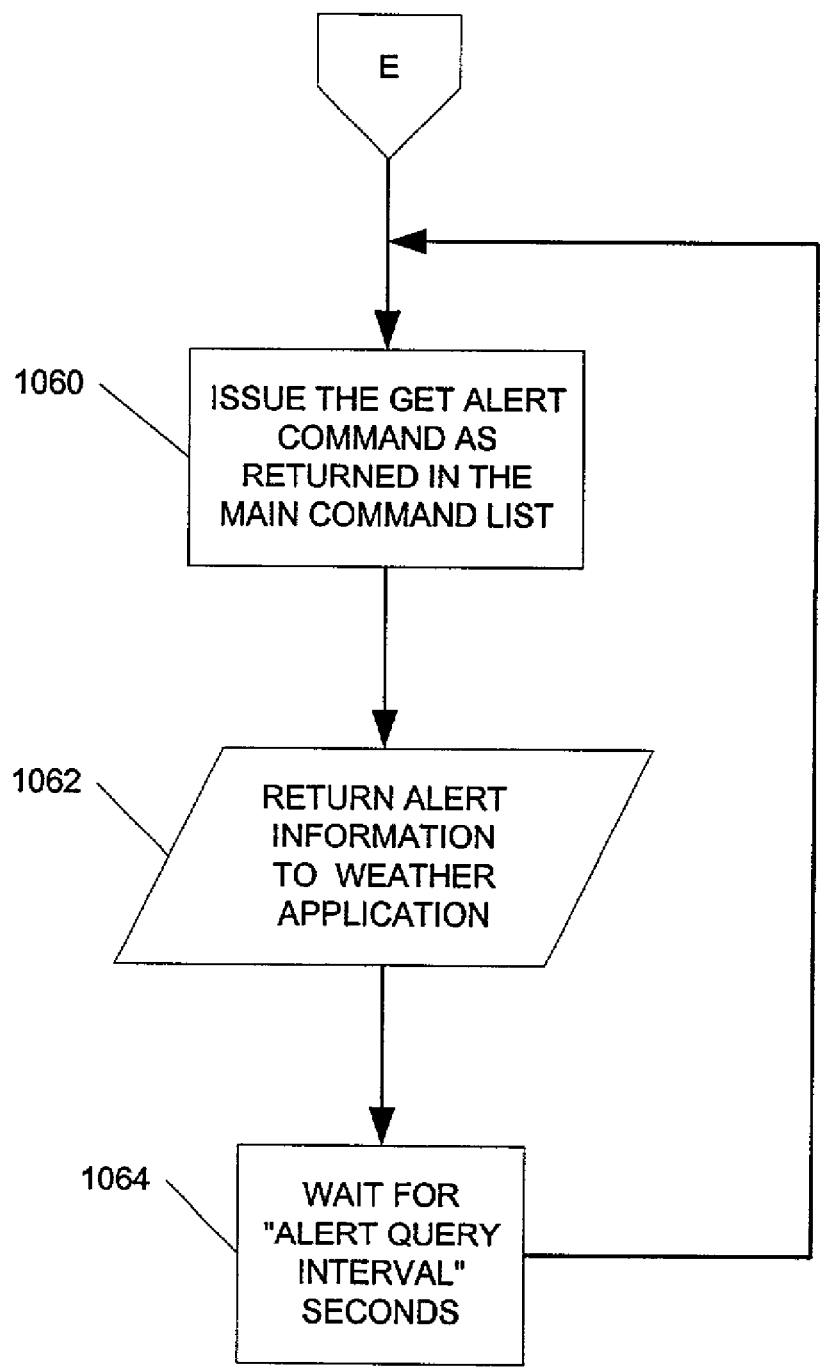

FIG. 9 illustrates an exemplary real-time weather information content display that is delivered to the desktop client device. The size of each area on the display is fixed. There is a single background bitmap that covers the entire display. Note that the background look of the desktop weather display can be changed but the location of data components must remain the same. The subscriber can change colors of the background to match a preferred look, but cannot change the location of the data.

Following a successful registration, the registration information is stored in the server database and a registration number is returned to the subscriber. The format of the command from the client device to the weather content server to register the client device is as follows:

"http ://wxserver_url/ RegDeskWx.asp?Version=&Name=&WZip=&Hzip= &TheZip=&Email=&Gender=&Age— &Income=&Occupation=&Download=&Spam=& PromoCode="

The information returned to the subscriber is a registration number.

The number in download.inf, which must be downloaded with the desktop weather application, represents the download site. If download.inf does not exist, the default download site identifier is "1".

If TheZip=0, Hzip (home zip code) is used as the default zip code, otherwise Wzip (work zip code) is used as the default zip code. Based on the zip code entered by the user, the stations in this zip code area will be returned from the weather content server.

The format of the "get stations" command to return the weather information to a user for a user-identified zip code is as follows:

"http://wxserver_url/ getstations.asp?Version=xx&ZipCode="

The data returned to the desktop weather application client includes number of stations, zip code, station identification, station name, city and state, distance, etc. After the user selects a station, the weather application client obtains the information for the station from the weather content server. This data is gathered every 1 to 4 hours, or as often as the forecast updates. The format of the "get forecast" command is as follows:

"http ://wxserver_url/ getforecastinfo.asp?ZipCode=xxxxx&StationID=xxx xx&Version=xxx&Units=xxx&RegNum=xxx"

The data returned to the desktop weather application includes a forecast for today including the forecasted high and low temperatures and general weather conditions (e.g., thunderstorms) and the same variable data for tomorrow's forecast.

The "asp" extension informs the web server that there is scripting in the web page that requires processing by an ASP processor. The server can determine the presence or absence of server side code and process the page accordingly. When the web page is requested, additional information is passed along with the HyperText Transfer Protocol (HTTP) request including the URL of the web page requested and the format of the data being passed. The request object in ASP has five collections, which are data containers that store data in name/value pairs. One of these is QueryString, which contains a collection of information, attached to the end of a URL and appended with a question mark. When the server sees the question mark, it knows that the URL has ended and that variables are starting. Query strings are built up using ampersands to delimit each name/value pair. In the above command, following the weather content server URL, the "get forecast" command includes values for the zip code, station identifier, version, units, and registration number for the subscriber FIGS. 10A–10F illustrate the processing logic for collecting and delivering current weather information content in accordance with an exemplary embodiment of the present invention. Processing starts as indicated in logic block 1000 with startup of the desktop weather application. In decision block 1002, a test is made to determine if the Internet is available. If not, a delay of five minutes is incurred before another check is made for Internet availability. If the Internet is available in decision block 1002, a test is then made in decision block 1004 to determine if an announcement pop-up is available. If it is, then the announcement pop-up is displayed to the subscriber as indicated in logic block 1006, otherwise, processing bypasses logic block 1006 and proceeds to logic block 1008.

Whenever the user starts the weather application after he has registered, an ASP is called in the background. If there is an event that needs to be shown, a window with an embedded mini-browser is popped up.

The format of the announcement command is as follows:
"http://wxserver_url/
announce.asp?RegNum=###&ZIP=&Version="

The information returned to the desktop weather application includes announcement number and announcement URL (empty if announcement number=0). If the announcement number is greater than a predetermined number, it is considered a new registration number for the user, so the registration number for the weather application is updated. The announcement URL is the web page for the announcement, which can be either a general announcement or other service registrations such as community portal service, school net, etc. If the announcement number indicates a re-registration, then the mini-browser tries to access the following announcement URL:
Announcement_URL(e.g., "http://wxserver_url/reregistration.asp?)
Reg_num=&Version=&Name=&Wzip=&Hzip=&TheZip=&Email=&Gender=&Age=&Income=&Occupation=&Download=Spam=&PromoCode="

If this is not a registration request, the mini-browser accesses Announcment_URL without appending any parameters.

Decision blocks 1002 and 1004 are executed in the form of HTTP requests to the weather content server. The desktop weather application then sends a request to the weather content server for the command list and generates one thread for each command in the returned list, as indicated in logic block 1008. The command list is a list of URLs that are used to create separate processes (threads) for querying information. The multiple threads that are generated for the corresponding commands are as indicated in control transfer blocks 1010, 1012, 1014, 1016, and 1018. Control transfer block 1010 represents the "get design" command thread. Control transfer block 1012 represents the "get weather data" command thread. Control transfer block 1014 represents the "get custom links" command thread. Control transfer block 1016 represents the "get cams" command thread. Control transfer block 1018 represents the "get alert" command thread. Corresponding to each control transfer block, processing continues simultaneously for each thread following the logic associated with the off page connectors A, B, C, D and E.

For the "get design" control transfer thread, the "get design" command is issued by the desktop weather application to the weather content server as indicated in logic block 1020. Design information is then returned to the desktop weather application as indicated in input/output block 1022. The "get design" command returns the following data to the desktop weather application: new version download URL; new version number; design query interval; foreground ad update interval; background image (wrap) URL; data RGB, shadow depth, data shadow RGB; arrow RGB; conditions RGB, shadow depth, conditions shadow RGB; filler color RGB; top left brand image URL; top left brand click URL; bottom right brand image URL; bottom right brand click URL; top ad URL (468×60); bottom ad URL (468×60); size of wrap; size of brand images; foreground ad update interval (non-live data); maximum time to show live data (sec); affiliate logo image URL; affiliate logo click URL; and affiliate logo image size. After the design information is returned to the weather application, processing then waits for a "design query interval" in seconds, as indicated in logic block 1024. When the design query interval has expired, processing returns to logic block 1020 to issue the next "get design" command.

Design information is delivered to the desktop weather in response to a command having the following format:
"http://wxserver_url/
gedesign.asp?ZipCode=xxxxx&StatinID=xxx&Units=X&Re gNum=xxxx&Version=xxxx&Color=0 or 1"

The ad rotation interval specifies how often a new advertisement is loaded when the application is in the foreground. If "_scookie=1" in the top ad or bottom ad URLs, only a session cookie is allowed. If "_no_cookie=1" in the top ad or bottom ad URLs, all cookies are disabled. If neither of the above texts are found in the top ad or bottom ad URLs, all cookies are recorded. If there is no affiliate logo URL, the three fields are left empty.

For any click URL (e.g., brands, logo), if a string "Target=Weaterbug" is appended to the URL, this URL is displayed in the center min-browser window, otherwise a default browser is launched. As examples, "http://wxserver_url/default.asp?cid=17" is displayed in a default browser, but "http://wxserver_url/default.asp?cid=17&Target=WeatherBug" will be displayed in the center mini-browser window. In any web page, if a link has Target="_WEATHERBUG" appended to it, the link is displayed in the center mini-browser window. If the target="_blank", the default browser is launched.

The information in the advertisements is based on the demographics, or DMA, of the user. Advertisements are published as HTML pages to ease the counting of the ads.

The background bitmap covers the whole background of the display. The URL for the background bitmap is checked with the design and is automatically downloaded and changed if there is a change in the URL.

The "get weather data" desktop is what the weather application calls to obtain weather information. The weather content server can detect if the weather content is being viewed by the user. If the weather application is being viewed by the subscriber, then the weather content server updates the desktop weather data at the "active query interval". If the weather content current temperature icon is in the system tray and not being viewed by the subscriber, then the weather content server updates the desktop weather data at the "inactive query interval" as described in conjunction with input/output block 1032 below. The temperature icon in the end user's system tray is dynamically updated with the current temperature for the selected weather station as long as the end user is connected to the weather content server. Processing for the weather data commences with the issue of the "get weather" data command by the desktop weather application as indicated in logic block 1030. The requested weather data is returned from the weather content server based on the user-selected weather station as indicated in input/output block 1032. The "get weather data" command returns the following data to the weather application client, that the weather content server has received from a weather station selected by the subscriber: time; date; temperature; wind direction; wind speed; gust direction; gust speed; today's rain fall; current rain rate; barometer; humidity; high temperature; low temperature; dew point; wind chill; rain this month; current temperature change rate; humidity change rate; barometer change rate; high humidity; low humidity; high temperature; low barometer; maximum rain rate; time of gusts; average wind direction; average wind speed; indoor temp; auxiliary temperature; light reading; yearly rain fall; indoor temperature rate; auxiliary temperature rate; light rate; station name; station city and state; active query interval; and inactive query interval. Following input/output block 1032, processing continues in decision block 1034 with a determination of whether the weather application is in the foreground (active) on the user's desktop. If the weather application is active, then processing waits for the "active query interval" in seconds, as indicated in logic block 1036 before returning to logic block 1030 to issue the next "get weather data" command. If the weather application is in the background in decision block 1034, then the weather application waits for the "inactive query interval" in seconds, as indicated in logic block 1038, before returning to logic block 1030 to issue the next "get weather data" command.

All the weather data is obtained from the weather content server. It is infeasible to get data directly from individual stations due to the heavy traffic for some school sites. Weather data is delivered to the desktop weather application by a command having the following format:

"http://wxserver_url/
  getdata.asp?&ZipCode=xxxxx&StationID=xxx&
  Units=X &RegNum=xxxx&Version=xxxx&Fore=0 or 1"

The StationID is checked first to see if the weather site is up. In the event that the weather site is down, the subscriber's zipcode is used to find the closest station that is up. If Fore=0 the program is running in the background, otherwise it is running in the foreground. Query frequencies are given at the end of each weather data buffer. "Active Query Frequency" and "Inactive/Background Query Frequency" are the query frequencies for the cases when the weather application program is running in the foreground or running in the background, respectively.

The "get custom links" command is issued by the desktop weather application to obtain: (1) the web page links for radar, forecast, travel weather, and "cool links" tabs on the weather application desktop; and (2) a list of URLs which are displayed when the user right clicks on the weather application icon when it is in the system tray, or left clicks on the upper left hand corner of the weather application display when it is opened full screen. The links and tabs on the desktop weather application can point to any specialized content such as sports or stock information. The naming conventions described herein are exemplary only because of the corresponding application to weather data.

Processing commences with the issue of the "get custom links" command by the desktop weather application as indicated in logic block 1040. The requested custom links information is then returned to the weather application as indicated by input/output block 1042. The "get custom links" command returns the following data to the weather application: custom links query interval (sec); URL for radar tab; URL for forecast tab; URL for travel weather tab; URL for "cool-links" tab; number of custom links (N); custom link 1 name; URL for custom link 1; custom link N; URL for custom link N. Following input/output block 1042, processing continues as indicated in logic block 1044 with the weather application waiting for the custom links query interval in seconds before returning to logic block 1040 to issue the next "get custom links" command.

The format of the command for custom broadcast link is as follows:

"http://wxserver_url/
  getcustomlinks.asp?ZipCode=xxxxx&
  StationID=xxx&Units=X&RegNum=xxxx&Version=xxxx"

The "get cams" command is what the weather application calls to get the closest InstaCam or third-party cam information. This command controls the web page that is displayed when the subscriber clicks on the InstaCam tab on the desktop weather application. Video cameras are connected to various computers on the Internet. At regular intervals, one frame of the video is sent by a video camera to a computer. A video capture board or other hardware captures the image by converting it into a binary format that can be read by computers. Typically, the picture is converted into the JPEG format, which is a graphics format that compresses the image while still retaining a high level of detail. The JPEG image is then linked to the weather content server. The link stays constant, even though the image itself changes regularly. Whenever an end user clicks on the link, the picture is sent to his web browser and displayed. This command can be used to customize the cams tab for any type of information, e.g., sports or stock quote information. Processing starts in logic block 1050 with the issue of the "get cams" command by the desktop weather application. The requested video camera information is returned to the desktop weather application as indicated in input/output block 1052. The "get cams" command returns the following data to the desktop weather application: cam query interval (sec); cam refresh rate (sec); and cam URL (for cam link on the desktop weather application). Processing then enters logic block 1054 where there is a wait for the cam query interval in seconds before returning to logic block 1050 for issue of the next "get cams" command.

The format of the command for obtaining InstaCam information is as follows:

"http://wxserver_url/getInstacam.asp?ZipCode=xxxxx
  &StationID=xxx&Units=X&RegNum=xxxx&Version=xxxx"

The InstaCam URL specified in the design table and all zip code information is appended to the command.

The "get alert" command is what the application calls to determine if there are any National Weather Service (NWS) warnings or advisories issued for the subscriber's given zip code. An alert is shown on the desktop weather application when an NWS warning is received from the NWS storm pager system. The current temperature icon in the system tray starts flashing and an audible "chirp" is transmitted to the end user client when a weather alert is received from the NWS. When the end user clicks on the flashing temperature icon, the alert information is displayed in a mini-browser window. The "get alert" command can also check if there are any subscriber specific messages/alerts waiting for the subscriber. For example, a subscriber of the weather application that is associated with a particular school weather reporting station can get alerts from the school principal about school delays or specific events. This command controls the web page that the subscriber gets when he clicks on the alerts tab on the desktop weather application. This command is very flexible and can be applied to any alert or subscriber messaging system, e.g., stock news alerts, or breaking news alerts.

Processing starts as indicated in logic block 1060 with the issue of the "get alert" command by the desktop weather application. This is followed by returning the alert information to the desktop weather application as indicated by input/output block 1062. The "get alert" command returns the following data to the weather application: alert query interval (sec); alert ID (0=no alert); alert URL (for alerts link on the weather desktop application); network code number; and alert icon URL. Processing then waits for the alert query interval in seconds as indicated in logic block 1064 before returning to logic block 1060 to issue the next get alert command.

The format of the command for weather service alerts is as follows:

"http://wxserver_url/getAlerts.asp?ZipCode=xxxxx &StationID=xxx&Units=X&RegNum=xxxx&Version =xxxx"

The Warning URL is specified in the design table and all zip code information is appended to the command.

The method and system for streaming dynamic weather content to the desktop of the present invention has been described as a computer-implemented process using application programs resident on a server with associated databases, and accessible over a public non-trusted network such as the Internet. The method and system are applicable to any dynamic information collection and desktop delivery system in which dynamic, constantly-changing data is being obtained from a plurality of information collecting stations and transmitted to an information content server, which simultaneously delivers requested content to a plurality of users. It is important to note; however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD-ROMs (e.g., types of computer storage media), and transmission type media such as analog or digital communications links.

Additionally, the corresponding structures, materials, acts, and equivalents of any means plus function elements in any claims are intended to include any structure, material or acts for performing the function in combination with other claimed elements as specifically claimed.

While the invention has been particularly shown and described with reference to a preferred embodiment thereof, it will be understood by those skilled in the art that various other changes in form and detail may be made without departing from the spirit and the scope of the invention.

What is claimed:

1. A method for streaming dynamic weather content simultaneously to a plurality of end user clients in a wide area communication system, comprising the steps performed at a centralized weather content server of:
    collecting dynamic weather content continuously and directly from a plurality of weather stations that sense weather conditions at different weather station locations;
    storing the dynamic weather content in the centralized weather content server;
    receiving a request for dynamic weather content from each end user client at predetermined time intervals, each request including a desired user location;
    selecting, as a selected weather station, a closest weather station in the plurality of weather stations for each end user client, the closest weather station being the weather station in the plurality of weather stations having a weather station location that is closest to the desired user location for each end user client;
    determining if the closest weather station for each end user client is operational or not operational, and selecting, as the selected weather station, an alternate nearby weather station for each user client when the closest weather station is determined to be not operational, the alternate nearby weather station being the weather station in the plurality of weather stations having a weather station location that is closest to the desired user location, except for the closest weather station, for each end user client;
    selecting dynamic weather content received from the selected weather station for each end user client based on the received desired user location and the determined operational status of the selected weather station; and
    transmitting the selected dynamic weather content from the centralized weather content server to each end user client.

2. The method for the streaming of dynamic weather content of claim 1 wherein the wide area communications system is the Internet.

3. The method for the streaming of dynamic weather content of claim 1 wherein the step of collecting dynamic weather content continuously comprises the act of receiving dynamically-changing weather content from a plurality of geographically distributed weather stations.

4. The method for the streaming of dynamic weather content of claim 1 wherein the step of collecting dynamic weather content comprises the act of receiving local weather alert content from at least one weather source.

5. The method for the streaming of the dynamic weather content of claim 1 wherein the dynamic weather content is updated in real-time.

6. The method for the streaming of dynamic weather content of claim 1, further comprising the steps of:
    interactively registering each end user client, including completion of a user profile, before selected dynamic weather content is transmitted to each end user client; and
    providing each end user client with a configuration for controlling the display of the selected dynamic weather content.

7. The method for the streaming of dynamic weather content of claim 1, further comprising the step of placing a current temperature icon that is updated in real-time on a display associated with each end user client.

8. The method for the streaming of dynamic content of claim 1 wherein the step of receiving a request for dynamic weather content from an end user client includes processing a message formatted according to the HyperText Transfer Protocol (HTTP).

9. The method for the streaming of dynamic weather content of claim 1 wherein the selected dynamic weather content is streamed as dynamically-changing local data to each end user client display and includes a current temperature icon that is placed in a system tray on a display associated with the end user client.

10. The method of claim 1, further comprising steps of:
    determining if each end user client has a weather display application installed or does not have the weather display application installed, the weather display application configured to display the selected dynamic weather content transmitted to each end user client; and
    downloading the weather display application from the weather content server to each end user client determined not to have the weather display application installed.

11. The method of claim 1, wherein the step of receiving a request for dynamic weather content further comprises:
extracting request parameters from a Universal Resource Locator included in the received request, the request parameters include at least one of a registration number of a user using the end user client, a zip code of the desired user location, a version number of a weather display application installed on the end user client, and an indication of whether the weather display application is operating in the foreground or the background.

12. The method of claim 1, wherein the collecting dynamic weather content further comprises collecting dynamic weather content including each of a temperature, a wind direction, a wind speed, a gust direction, a gust speed, a cumulative rain fall for a current day, a rain fall rate, a barometric pressure, a humidity, a highest temperature measured over a period of time, a lowest temperature measured of the period of time, a dew point, a wind chill, a cumulative rain fall for a current month, a temperature change rate, a humidity change rate, a barometric pressure change rate, a highest humidity measured over the period of time, a lowest humidity measured over the period of time, a highest barometric pressure measured over the period of time, a lowest barometric pressure measured over the period of time, a maximum rain rate measured over the period of time, a time of gusts, an average wind direction, an average wind speed, an indoor temperature, an auxiliary temperature, a light reading, a cumulative rain fall for a current year, an indoor temperature rate, an auxiliary temperature rate, a light rate, a station name, a station city, a station state, an active query interval, and an inactive query interval.

13. A system for streaming dynamic weather content simultaneously to a plurality of end user clients in a wide area communication network, comprising:
at least one storage device for storing a plurality of databases, including a weather content database; and
a centralized weather content server connected to the storage device and operating a computer program including:
an information handling component configured to collect dynamic weather content continuously and directly from a plurality of weather stations that sense weather conditions at different weather station locations;
a storing component configured to store the dynamic weather content in the weather content database;
a message receiving component configured to receive a request for dynamic weather content from each end user client at predetermined time intervals, each request including a desired user location;
a weather station selecting component configured to select, as a selected weather station, a closest weather station in the plurality of weather stations for each end user client, the closest weather station being the weather station in the plurality of weather stations having a weather station location that is closest to the desired user location for each end user client;
a determining component configured to determine if the closest weather station for each end user client is operational or not operational, and configured to select, as the selected weather station, an alternate nearby weather station for each user client when the closest weather station is determined to be not operational, the alternate nearby weather station being the weather station in the plurality of weather stations having a weather station location that is closest to the desired user location, except for the closest weather station, for each end user client;
a selection component configured to select dynamic weather content received from the selected weather station for each end user client based on the received desired user location and the determined operational status of the selected weather station; and
a transmission component configured to transmit the selected dynamic weather content from the centralized weather content server to each end user client.

14. The system for the streaming of dynamic weather content of claim 13 wherein the computer program further comprises:
a registration component configured to interactively register each end user client, including completion of a user profile, before selected dynamic weather content is transmitted to each end user client; and
a configuration component configured to provide each end user client with a configuration to control the display of the selected dynamic weather content.

15. The system for the streaming of dynamic weather content of claim 13 wherein the message receiving component further comprises a module configured to process a message formatted according to the HyperText Transfer Protocol (HTTP).

16. The system for the streaming of dynamic weather content of claim 13 wherein the transmission component is configured to transmit the selected dynamic weather content as dynamically-changing local weather data to the end user client display, the weather data including a current temperature icon that is placed in a system tray on a display associated with the end user client.

17. The system of claim 13, further comprising:
an application determining component configured to determine if each end user client has a weather display application installed or does not have the weather display application installed, the weather display application configured to display the selected dynamic weather content transmitted to each end user client; and
an application downloading component configured to download the weather display application from the weather content server to each end user client determined not to have the weather display application installed.

18. The system of claim 13, wherein the message receiving component further comprises:
a parsing component configured to extract request parameters from a Universal Resource Locator included in the received request, the request parameters include at least one of a registration number of a user using end user client, a zip code of the desired user location, a version number of a weather display application installed on the end user client, and an indication of whether the weather display application is operating in the foreground or the background.

19. The system of claim 13, wherein the information handling component is further configured to collect dynamic weather content including each of a temperature, a wind direction, a wind speed, a gust direction, a gust speed, a cumulative rain fall for a current day, a rain fall rate, a barometric pressure, a humidity, a highest temperature measured over a period of time, a lowest temperature measured of the period of time, a dew point, a wind chill, a cumulative rain fall for a current month, a temperature change rate, a humidity change rate, a barometric pressure change rate, a highest humidity measured over the period of time, a lowest humidity measured over the period of time, a highest barometric pressure measured over the period of time, a lowest barometric pressure measured over the period of time, a maximum rain rate measured over the period of time, a time of gusts, an average wind direction, an average wind speed, an indoor temperature, an auxiliary temperature, a light reading, a cumulative rain fall for a current year, an indoor temperature rate, an auxiliary temperature rate, a light rate, a station name, a station city, a station state, an active query interval, and an inactive query interval.

20. A computer readable storage medium containing a computer program product for the streaming of dynamic weather content simultaneously to a plurality of end user clients in a wide area communication system, the computer program product comprising:

program instructions that continuously collect dynamic weather content directly from a plurality of weather stations that sense weather conditions at different weather station locations;

program instructions that store the dynamic weather content in a centralized weather content server;

program instructions that receive a request for dynamic weather content from each end user client at predetermined time intervals, each request including a desired user location;

program instructions that select, as a selected weather station, a closest weather station in the plurality of weather stations for each end user client, the closest weather station being the weather station in the plurality of weather stations having a weather station location that is closest to the desired user location for each end user client;

program instructions that determine if the closest weather station for each end user client is operational or not operational, and selecting, as the selected weather station, an alternate nearby weather station for each user client when the closest weather station is determined to be not operational, the alternate nearby weather station being the weather station in the plurality of weather stations having a weather station location that is closest to the desired user location, except for the closet weather station. for each end user client;

program instructions that select dynamic weather content received from the selected weather station for each end user client based on the received desired user location and the determined operational status of the selected weather station; and program instructions that transmit the selected dynamic weather content from the centralized weather content server to each end user client.

21. The computer product for the streaming of dynamic weather content of claim 20 wherein the program instructions that continuously collect dynamic weather content comprise program instructions that receive dynamic weather content from a plurality of geographically distributed weather stations.

22. The computer program product for the streaming of dynamic weather content of claim 20 wherein the program instructions that collect dynamic weather content comprise program instructions that receive local weather alert content from at least one weather source.

23. The computer product for the streaming of dynamic weather content of claim 20 wherein the dynamic weather content is updated in real-time.

24. The computer program product for the streaming of dynamic weather content of claim 20, further comprising:

program instructions that interactively register each end user client before selected dynamic weather content is transmitted to each end user client;

program instructions that provide each end user client with a configuration to control the display of the selected dynamic weather content.

25. The computer program product for the streaming of dynamic weather content of claim 20 wherein the program instructions that receive a request for dynamic weather content from each end user client include program instructions that process a message formatted according to the HyperText Transfer Protocol (HTTP).

26. The computer product of claim 20, further comprising:

program instructions that determine if each end user client has a weather display application installed or does not have the weather display application installed, the weather display application configured to display the selected dynamic weather content transmitted to each end user client; and program instructions that download the weather display application from the weather content server to each end user client determined not to have the weather display application installed.

27. The computer product of claim 20, wherein the program instructions that receive a request further comprise program instructions that extract request parameters from a Universal Resource Locator included in the received request, the request parameters include at least one of a registration number of a user using end user client, a zip code of the desired user location, a version number of a weather display application installed on the end user client, and an indication of whether the weather display application is operating in the foreground or the background.

28. The computer product of claim 20, wherein the program instructions that continuously collect dynamic weather content includes program instructions that continuously collect dynamic weather content including each of a temperature, a wind direction, a wind speed, a gust direction, a gust speed, a cumulative rain fall for a current day, a rain fall rate, a barometric pressure, a humidity, a highest temperature measured over a period of time, a lowest temperature measured of the period of time, a dew point, a wind chill, a cumulative rain fall for a current month, a temperature change rate, a humidity change rate, a barometric pressure change rate, a highest humidity measured over the period of time, a lowest humidity measured over the period of time, a highest barometric pressure measured over the period of time, a lowest barometric pressure measured over the period of time, a maximum rain rate measured over the period of time, a time of gusts, an average wind direction, an average wind speed, an indoor temperature, an auxiliary temperature, a light reading, a cumulative rain fall for a current year, an indoor temperature rate, an auxiliary temperature rate, a light rate, a station name, a station city, a station state, an active query interval, and an inactive query interval.

* * * * *